US006960117B1

United States Patent
Mahadev et al.

(10) Patent No.: US 6,960,117 B1
(45) Date of Patent: Nov. 1, 2005

(54) METHOD TO ELIMINATE DEFECTS ON THE PERIPHERY OF A SLIDER DUE TO CONVENTIONAL MACHINING PROCESSES

(75) Inventors: Niraj Mahadev, Milpitas, CA (US); Kazumasa Yasuda, Sunnyvale, CA (US); Winston Jose, San Jose, CA (US)

(73) Assignee: SAE Magnetics (H.K.) Ltd., Shatin (HK)

( * ) Notice: Subject to any disclaimer, the term of this patent is extended or adjusted under 35 U.S.C. 154(b) by 0 days.

(21) Appl. No.: 10/833,878

(22) Filed: Apr. 28, 2004

(51) Int. Cl.[7] ................................................. B24B 1/00
(52) U.S. Cl. .......................................... 451/37; 451/57
(58) Field of Search ............................ 451/36, 37, 57, 451/59

(56) References Cited

U.S. PATENT DOCUMENTS

| | | | |
|---|---|---|---|
| 4,301,353 A | * 11/1981 | Suenaga et al. | ....... 219/121.69 |
| 5,335,458 A | 8/1994 | Stoffers et al. | |
| 5,468,177 A | 11/1995 | Kindler et al. | |
| 5,603,156 A | 2/1997 | Biskeborn et al. | |
| 5,632,669 A | 5/1997 | Azarian et al. | |
| 5,722,156 A | * 3/1998 | Balfrey et al. | ............ 29/603.08 |
| 5,735,036 A | 4/1998 | Barr et al. | |
| 5,749,769 A | 5/1998 | Church et al. | |
| 5,773,791 A | * 6/1998 | Kuykendal | ............. 219/121.84 |
| 5,872,686 A | * 2/1999 | Dorius et al. | ............. 360/236.3 |
| 5,885,131 A | 3/1999 | Azarian et al. | |
| 5,902,499 A | * 5/1999 | Richerzhagen | ......... 219/121.84 |
| 5,982,583 A | 11/1999 | Strom | |
| 6,040,034 A | 3/2000 | Okada et al. | |
| 6,040,959 A | 3/2000 | Kobayashi et al. | |
| 6,255,621 B1 | 7/2001 | Lundquist et al. | |
| 6,398,623 B1 | 6/2002 | Fukuroi et al. | |
| 6,531,084 B1 | 3/2003 | Strom et al. | |
| 6,777,647 B1 | * 8/2004 | Messal et al. | ......... 219/121.84 |
| 2001/0030835 A1 | 10/2001 | Hipwell et al. | |
| 2001/0043559 A1 | 11/2001 | Schaenzer et al. | |
| 2002/0039256 A1 | 4/2002 | Polycarpou et al. | |
| 2004/0087253 A1 | 5/2004 | Mahadev et al. | |

FOREIGN PATENT DOCUMENTS

| | | |
|---|---|---|
| CN | 1254922 A | 5/2000 |
| JP | 2301014 A2 | 12/1990 |
| JP | 5282641 A2 | 10/1993 |
| JP | 8203050 A2 | 8/1996 |
| JP | 9091648 A2 | 4/1997 |
| JP | 9290359 A2 | 11/1997 |

OTHER PUBLICATIONS

Ser. No.: 10/691,389; Filed: Oct. 22, 2003, Title: "System and Method for Edge Blending Hard Drive Head Sliders", Applicant/Inventor: Zhu Jian Zhan et al.

Article: The Marker becomes more demanding Time for a new way of thinking, Synova S.A., "The Water Jet Guided Laser", Laser MicroJet™, pp. 1–2, http://www.synova.ch/main.php.

* cited by examiner

*Primary Examiner*—Dung Van Nguyen
(74) *Attorney, Agent, or Firm*—Kenyon & Kenyon (57) ABSTRACT

A method of slider machining is disclosed. A slider may be diced out of a row bar. A jet of clean air may dry the slider. A laser, guided by a jet of water, may micro-grind the periphery of the slider. The edges of the slider and the corners of the leading edge may be rounded to a predetermined radius. The slider may be cleaned with de-ionized water, then dried in a hot oven.

20 Claims, 7 Drawing Sheets

METHOD TO ELIMINATE DEFECTS ON THE PERIPHERY OF A SLIDER DUE TO CONVENTIONAL MACHINING PROCESSES

BACKGROUND INFORMATION

The present invention relates to sliders of magnetic hard disk drives. More specifically, the present invention relates to the manufacture of sliders for hard disk drives.

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few nanometers above the surface of the rotating disk. The flying height of the slider is viewed as one of the most critical parameters affecting the magnetic disk reading and recording capabilities of a mounted read/write element. A relatively small flying height allows the transducer to achieve greater resolution between different data bit locations on the disk surface, thus improving data density and storage capacity. With the increasing popularity of lightweight and compact notebook type computers that utilize relatively small yet powerful disk drives, the need for a progressively lower flying height has continually grown.

Figure 1:
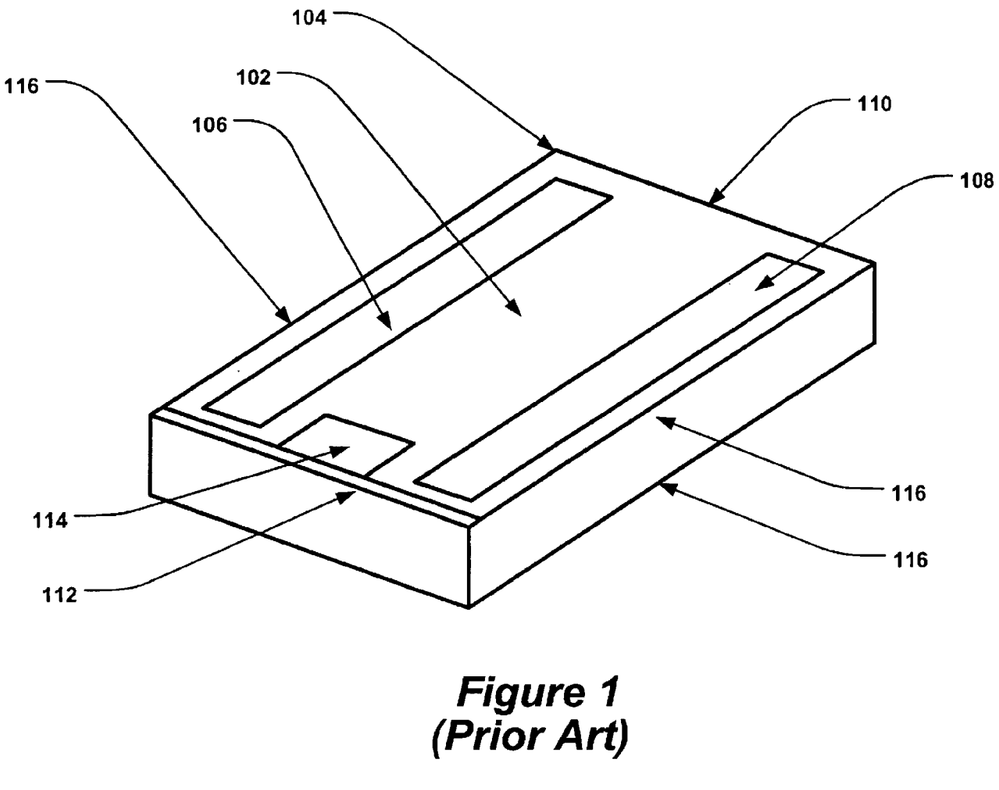
FIG. 1 is a perspective view of a slider device with a read/write head that is known in the art.

As shown in FIG. 1 an ABS 102 design known for a common catamaran slider 104 may be formed with a pair of parallel rails 106 and 108 that extend along the outer edges of the slider surface facing the disk. Other ABS 102 configurations including three or more additional rails, with various surface areas and geometries, have also been developed. The two rails 106 and 108 typically run along at least a portion of the slider body length from the leading edge 110 to the trailing edge 112. The leading edge 110 is defined as the edge of the slider that the rotating disk passes before running the length of the slider 104 towards a trailing edge 112. The leading edge 110 may be tapered despite the large undesirable tolerance typically associated with this machining process. The transducer or magnetic element 114 is typically mounted at some location along the trailing edge 112 of the slider as shown in FIG. 1. The rails 106 and 108 form an air bearing surface on which the slider flies, and provide the necessary lift upon contact with the air flow created by the spinning disk. As the disk rotates, the generated wind or air flow runs along underneath, and in between, the catamaran slider rails 106 and 108. As the air flow passes beneath the rails 106 and 108, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 106 and 108, the large surface area of the slider body 104 would produce an excessively large air bearing surface area. In general, as the air bearing surface area increases, the amount of lift created is also increased. Without rails, the slider would therefore fly too far from the rotating disk thereby foregoing all of the described benefits of having a low flying height.

The current slider manufacturing technique involves diamond related machining processes such as slicing, grinding, lapping, and dicing. The dicing process in particular is very critical, often performed by using a circular diamond saw blade rotating at high speeds with a constant feed of coolant water to reduce the temperature of the working material.

During this dicing process, the edges 116 along the diced surface are subjected to mechanical deformation forming ridges along the slider's edge. The amount of deformation is typically in the range of 10 to 15 nm in height depending upon machining parameters such as feed rate, blade quality, and others. This slider edge ridge could also lead to catastrophic failures at the head disk interface if they become higher than the ABS of the slider. This problem rises exponentially with decreasing form factor of the drive head, such as from PICO to FEMTO sliders.

Another major problem of the conventional diamond-sawing process is the generation of micro-cracking or fracturing along the edges of the slider as a result of heat generated during machining. When built into the drives, these could behave as nucleus points for fracturing during thermal or mechanical shock loading of the slider. With the slider capacity ever increasing and the fly height of the slider continuously decreasing, this becomes an undesirable defect.

Substrate particle generation is also a key problem that potentially arises due to the micro-cracking and fracturing of the slider edges of the substrate. These particles could arise from the leading edge and the diced edges of the ABS as a result of dicing.

One approach to minimize these problems could be by optimizing the cutting parameters on the dicing machine, such as feed rate, coolant flow, and spindle rotation speed. With this method, the amount of buildup and micro-cracks could be reduced to a certain extent but can never be eliminated since there will always be some amount of deformation and fracture as a result of the cutting mechanism.

In an alternate method, a laser is used to apply heat to the dicing edge 116 of the slider and thus altering the stress levels as a result of which the slider edge ridge is shifted below the ABS of the slider. Since this process also alters slider curvature, both crown and cross crown, the process can compensate for the slider ridge only if the curvature required by the slider is higher than that of the ridge. With the advancement in the ABS designs, the fly-height could become virtually insensitive to the slider curvature or require sliders without any curvature. Also this technique does not address particle generation due to the leading edge, which could become a source for particle pull out. Another technique changes the slider 104 curvature by heating the backside of the slider with a laser to change the slider curvature and in turn altering the slider edge ridges below the ABS surface.

Most of the previously mentioned techniques use conventional continuous or pulsed lasers to ablate the slider material. One of the major problems associated with these lasers is the amount of localized heat that is generated. This heat could lead to re-positioning of the material and further initiate micro-cracking and fracturing of the edges that could propagate into calamitous failures in the drive level.

Figure 2:
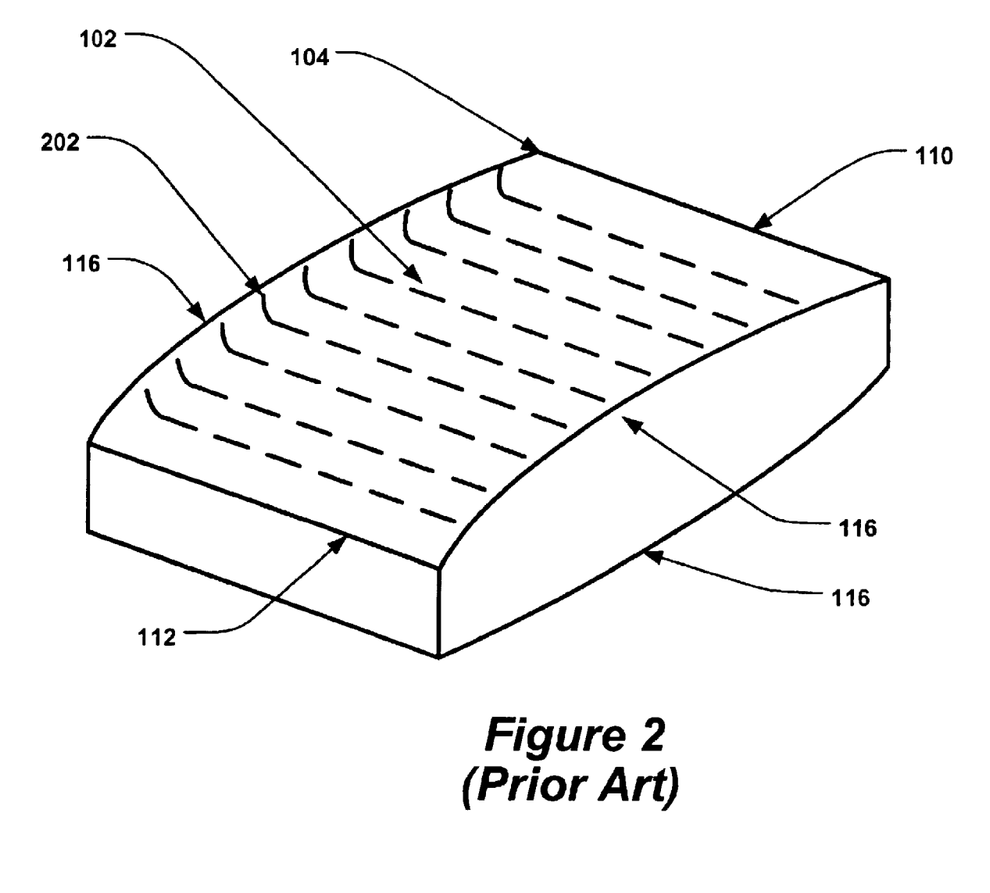
FIG. 2 is a perspective view of a slider deformed by the dicing process that is known in the art.

As stated above, the dicing process is a critical step in the slider fabrication since it is the last machining step in the line before the head gimbal assembly (HGA) manufacturing process begins. As shown in FIG. 2, the dicing step leaves mechanical stresses and deformations 202 along the edges 116 of the air bearing surfaces (ABS) 102. These deformations 202 could be a result of build up of compressive stresses at the ABS 102 due to previous processes such as lapping. With the disk storage density continuously increasing, the demand for the slider to fly closer to the disk surface also increases. If the deformations 202 at the slider edge 116 happen to be higher than the ABS, this could lead to catastrophic failures in the disk drives.

DETAILED DESCRIPTION

A method of slider machining is disclosed. In one embodiment, a slider is diced out of a row bar and a jet of clean air may dry the slider. A laser, guided by a jet of water, micro-grinds the periphery of the slider. The edges of the slider and the corners of the leading edge may be rounded to a pre-determined radius. The slider is cleaned with de-ionized water, then dried in a hot oven.

Figure 3:
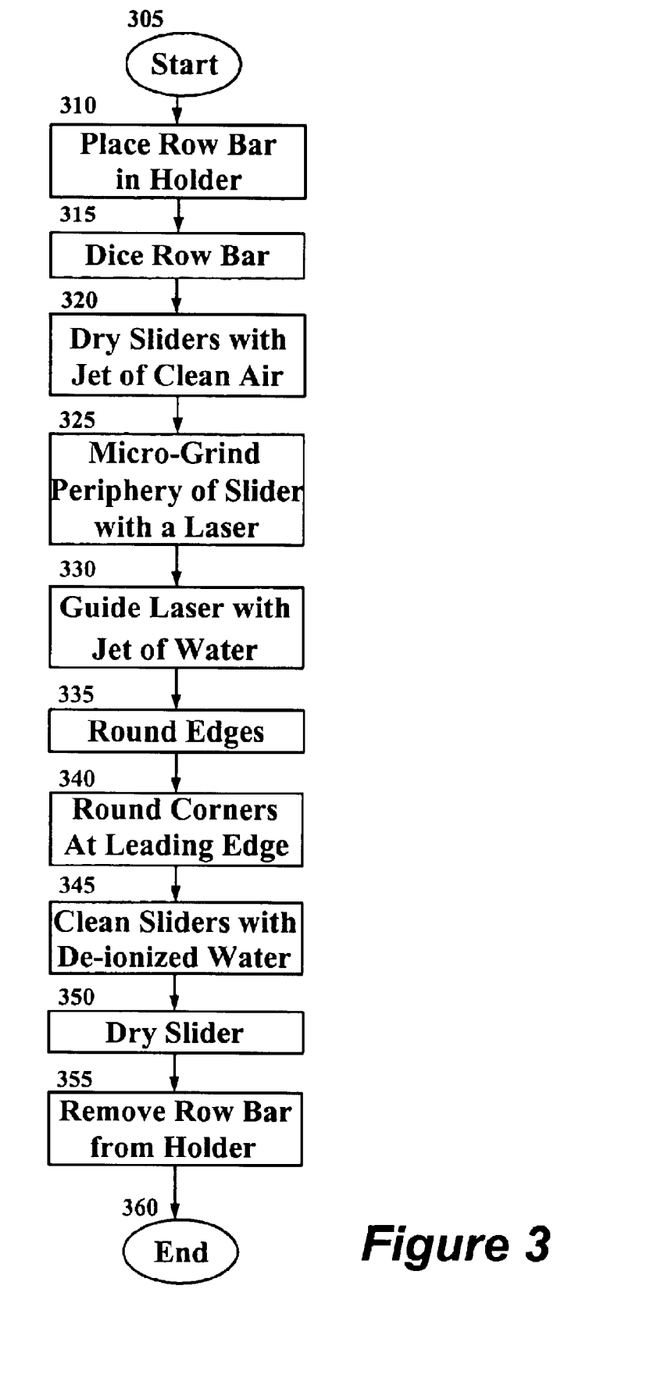
FIG. 3 illustrates in a flowchart one method for machining sliders according to an embodiment of the present invention.
Figure 4:
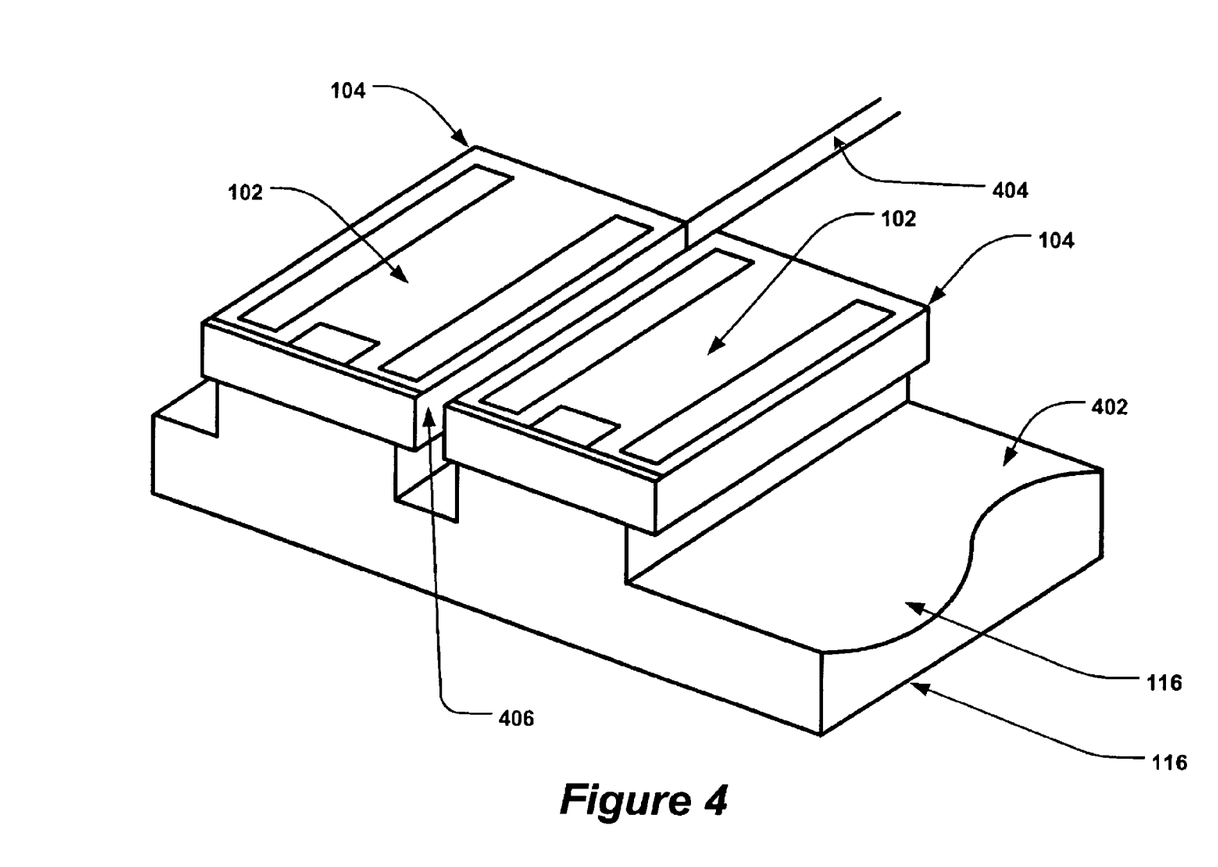
FIG. 4 is a perspective view of a holder and slider according to an embodiment of the present invention.

FIG. 3 illustrates in a flowchart one method for machining sliders according to an embodiment of the present invention. The process starts (Block 305) by placing a row bar into a holder or part off tool 402 (Block 310), as shown in FIG. 4. The row bar may be made of an AlTiC compound. A conventional diamond saw may be used to dice the row bars into sliders 104 (Block 315). This method typically produces ridges in the order of 20 to 40 microns from the ABS pad towards the slider edge and approximately 12 microns in height, as previously shown in FIG. 2. After dicing, the slider may be dried using a jet of clean air (Block 320).

Figures 5A, 5B:
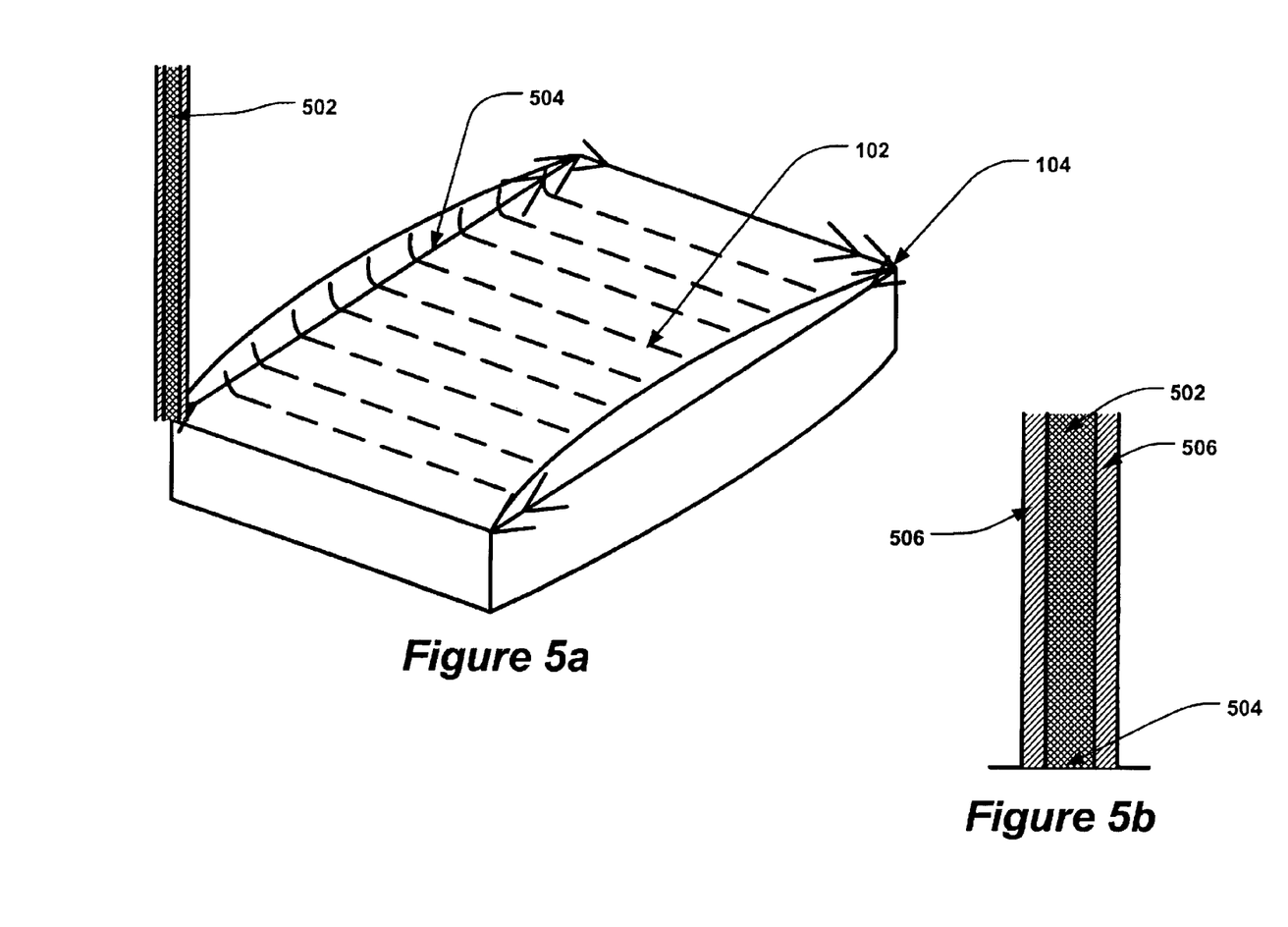
FIGS. 5a–b are a perspective view of a slider and water-jet guided laser according to an embodiment of the present invention.

The parted sliders 104 may remain on the holder 402 as a laser 502 is used to micro-grind the entire periphery 504 of the ABS 102 of the slider 104 (Block 325), as shown in FIG. 5a. The laser 502 is guided by a jet of water 506 (Block 330), as is shown in FIG. 5b. The jet of water 506 may be focused through a very small nozzle onto the slider 104. The laser 502 may be a pulsed laser. The beam travels through the jet of water 506 and hits the slider 104. By using a pulsed laser 502 through the jet of water 506, the cooling effect may dominate the laser heating effect. The jet of water 506 is mainly used as an optical guide for the laser beam 502. Since the water jet cools as the laser beam ablates the material the slider is not damaged by heat induction. The curvature of the slider does not change and the edges 504 are burr, crack, and fracture free. A SYNOVA® Micro-jet® laser may be used as the water-jet guided laser 502.

Alternatively, the water-jet guided laser 502 may be used to dice the row bar, allowing a narrower dicing kerf 404 of approximately 30 microns. The dicing kerf 404 is the distance between the diced surfaces 406. Reducing the dicing kerf 404 allows more sliders to be packed onto a row bar, decreasing the cost of materials.

Figure 6:
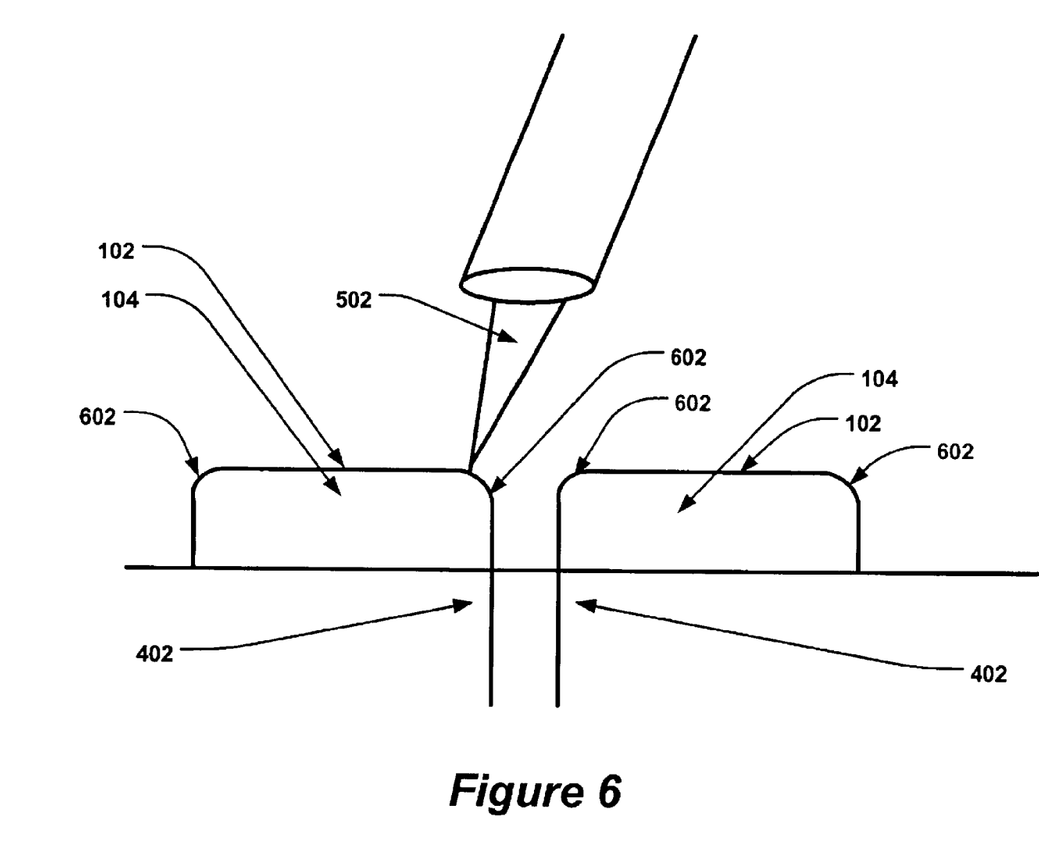
FIG. 6 is a side view of a slider having its edges rounded according to an embodiment of the present invention.

The amount of micro-grinding on the slider depends entirely on the dicing of the row blocks and the form factor of the slider. The slider edge ridges 506 may be removed completely and a small-radius curvature 602 along the diced and leading edges 504 (Block 335), as shown in FIG. 6. Rounding the edges may reduce the particle fall out possibility from the slider during drive operation. The nozzle of the water jet may be opened to 40 microns for this part of the process.

Figure 7A:
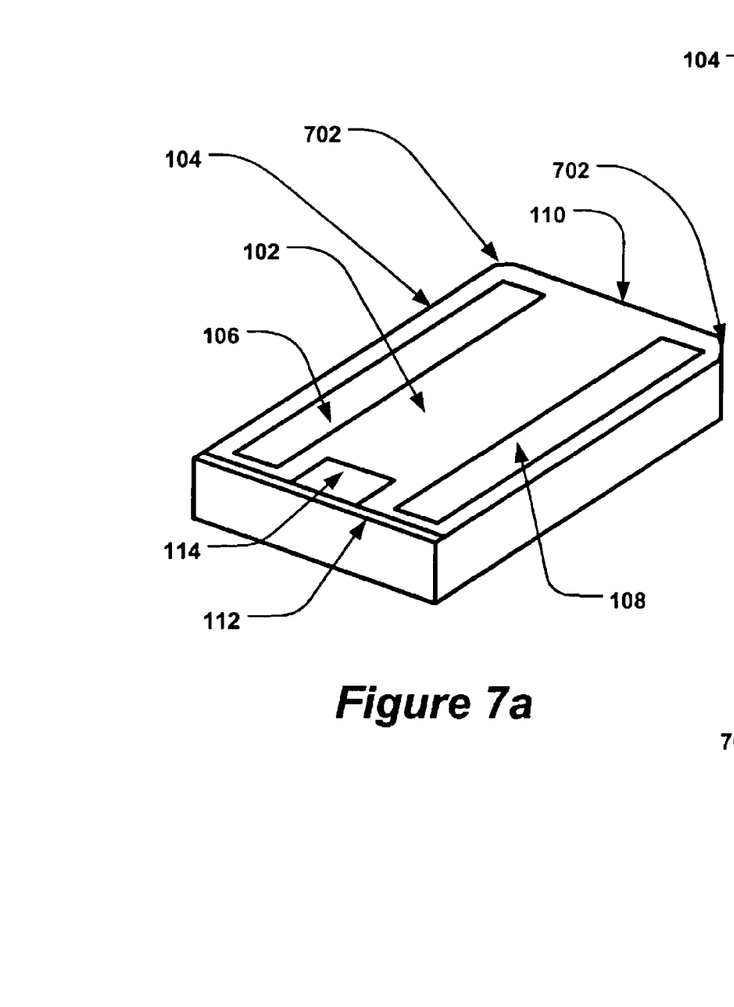
FIGS. 7a–b are a perspective view and top view of a slider with the corners of the leading edges rounded according to an embodiment of the present invention.
Figure 7B:
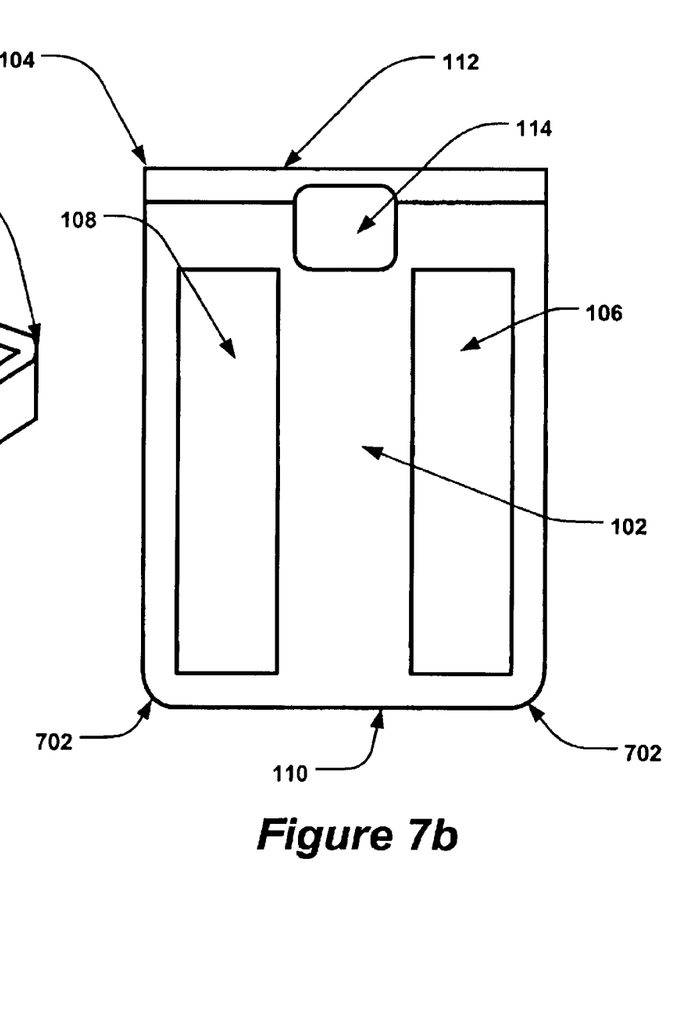

The corners 702 formed at the leading edge may damage the disk during the event of shock loading on the drive. The water-jet guided laser 502 may grind the corners of the leading edge 702 to a desirable radius (Block 340), as shown in a perspective view in FIG. 7a and in a top view in FIG. 7b. The grinding could be incorporated into the dicing process, reducing steps in the manufacturing line.

The sliders 104 may then be cleaned using regular de-ionized water (Block 345). The sliders may then be dried in a hot oven (Block 350). The sliders 104 may then be demounted from the part off tool 402 and placed into trays for regular production processes (Block 355), completing the process (Block 360).

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method, comprising:
   dicing a slider from a row bar;
   micro-grinding a periphery of the slider with a laser; and
   guiding the laser with a jet of water.

2. The method of claim 1, wherein the laser is a pulsed beam.

3. The method of claim 1, wherein the laser travels through the jet of water as the laser and the water hit the slider.

4. The method of claim 1, further comprising drying the slider with a clean jet of compressed air between dicing and micro-grinding.

5. The method of claim 1, further comprising removing edge ridges of the slider with the laser and the jet of water.

6. The method of claim 5, further comprising rounding a small-radius curvature along diced and leading edges of the slider.

7. The method of claim 1, further comprising cleaning the slider with de-ionized water.

8. The method of claim 1, further comprising drying the slider in a hot oven.

9. The method of claim 1, further comprising rounding corners at a leading edge of the slider.

10. A slider manufacturing system, comprising:
   a diamond saw to dice a slider out of a row bar;
   a laser to micro-grind a periphery of the slider; and
   a water jet to guide the laser.

11. The slider manufacturing system of claim 10, wherein the laser is a pulsed beam.

12. The slider manufacturing system of claim 10, wherein the laser travels through the jet of water as the laser and the water hit the slider.

13. The slider manufacturing system of claim 10, further comprising a compressed air jet to dry the slider between dicing and micro-grinding.

14. The slider manufacturing system of claim 10, wherein the laser and the jet of water are to remove edge ridges of the slider.

15. The slider manufacturing system of claim 14, wherein the laser and the jet of water are to round a small-radius curvature along diced and leading edges of the slider.

16. The slider manufacturing system of claim 10, further comprising a de-ionized water jet to clean the slider by spraying.

17. The slider manufacturing system of claim 10, further comprising a de-ionized water tank to clean the slider by dipping.

18. The slider manufacturing system of claim 10, further comprising a hot oven to dry the slider.

19. The slider manufacturing system of claim 10, wherein the laser and the jet of water are to round corners at a leading edge of the slider.

20. The slider manufacturing system of claim 10, further comprising a holder to support the slider.

\* \* \* \* \*